No. 613,916. Patented Nov. 8, 1898.
G. E. WEEDEN.
ANIMAL TRAP.
(Application filed Dec. 6, 1897.)
(No Model.)
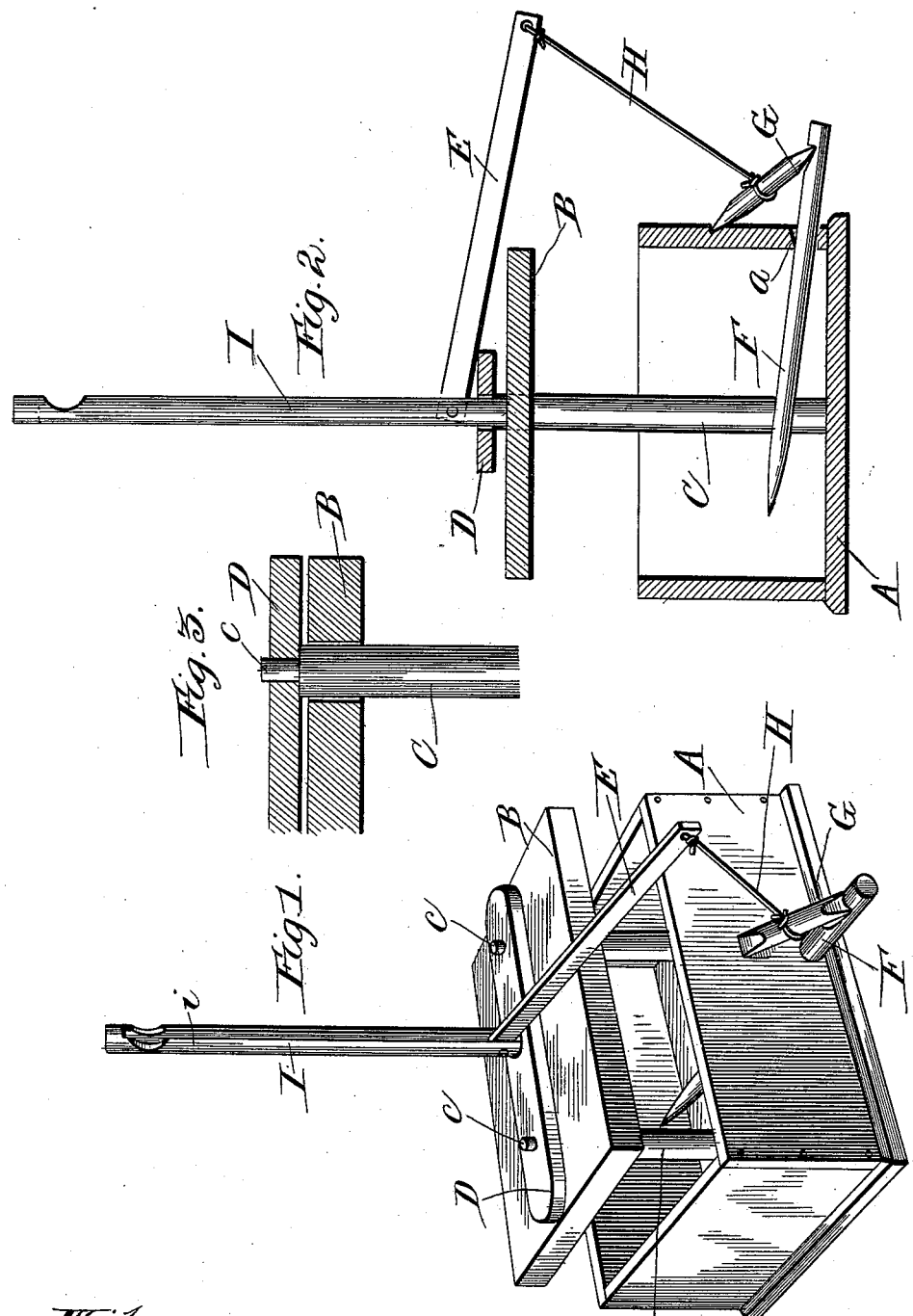
Witnesses:
A. F. Durand.
Margaret M. Wagner
Inventor:
George E. Weeden.
by Chas. L. Page
Atty.

UNITED STATES PATENT OFFICE.

GEORGE E. WEEDEN, OF CHICAGO, ILLINOIS, ASSIGNOR OF ONE-HALF TO SAMUEL ARTHUR, OF SAME PLACE.

ANIMAL-TRAP.

SPECIFICATION forming part of Letters Patent No. 613,916, dated November 8, 1898.

Application filed December 6, 1897. Serial No. 660,974. (No model.)

*To all whom it may concern:*

Be it known that I, GEORGE E. WEEDEN, a citizen of the United States, residing at Chicago, in the county of Cook and State of Illinois, have invented a certain new and useful Improvement in Animal-Traps, of which the following is a specification.

My invention relates to animal-traps particularly adapted for catching rats, and involving a drop or dead-fall and setting mechanism by which the drop or dead-fall is normally elevated and permitted to descend when the setting mechanism is sprung.

Objects of my invention are to provide a simple and effective construction of trap wherein rats or the like can be both confined and killed or, if desired, caught alive; to permit more than one rat or the like to be caught at one and the same time; to provide a novel and highly sensitive form of setting device, and to readily and effectively destroy the confined rats when so desired.

In the accompanying drawings, Figure 1 represents my improved trap in perspective with the drop-cover elevated and so maintained by the setting mechanism. Fig. 2 is a section taken transversely through Fig. 1 on a vertical plane at one side of the middle of the drop-cover. Fig. 3 is a section through a portion of the cover and cross-bar on a plane at right angles to the plane of Fig. 2.

The trap comprises a box or casing A, constructed with sides and a bottom and forming a chamber into which rats or the like may enter by way of its normally open top. This box can be closed at a proper moment by a vertically-sliding drop-cover B, adapted to fit and slide vertically within the box and normally maintained by the setting mechanism above the box, so as to leave between the drop-cover and the upper edges of the sides of the box a suitable passage-way for the rats or other small animals which are to be caught.

The drop-cover is guided and steadied in its movement by guide-rods C, which rise from the bottom of the box and extend through openings in the drop-cover, illustration of such sliding connection between the drop-cover and guide-rods being afforded by Fig. 3, in which a portion of one of the guide-rods is shown.

The upper ends of the guide-rods C are tied together and steadied by a cross bar or head D, arranged above the drop-cover and conveniently provided with small sockets in which the reduced upper terminals $c$ of the guide-rods are fitted as a simple mode of rigid connection between the guide-rods and the cross-bar.

The setting mechanism comprises a vibratory arm E, which is pivotally connected with the drop-cover, a trigger stick or lever F, which extends through an opening $a$ in one of the sides of the box, a catch G, adapted to permit its ends to engage in notches in said side of the box and the outer end of the trigger-stick, respectively, and suitable flexible connection between the outer end of the vibratory arm and the catch—such, for example, as a link or a cord H.

The arm E, which is arranged to swing in a vertical plane, is pivotally connected with the drop-cover indirectly through the medium of a socket-rod I, which is rigidly secured to and arranged to rise from the middle of the drop-cover. This socket-rod extends and works through an opening in the cross-bar D and is provided with a longitudinally-extending channel $i$. The inner end of the arm E is hinged within the lower end of the channel in the socket-rod, and such channel is adapted to receive the entire length and width of the arm E when the latter is swung upwardly to a suitable extent. In this way the channel in rod I forms a socket which can receive the arm E, so as to permit both the rod and the arm to readily slide through the opening in the cross-bar D when the trap is sprung.

When the trap is set, the trigger-stick assumes about the position shown, and is so maintained by forcing the said trigger-stick inward, and thereby cramping or jamming the same in the opening $a$, through which it extends, such cramping or jamming on the part of the stick being obviously due to the action of the catch G, the catch G engaging in notches in the box and the trigger-stick. Under such conditions the drop-cover will be elevated, the arm E will be swung outwardly or away from the socket-rod and bear upon the bar D, and the cord H will be taut by reason of the weight of the drop-cover upon the hinged end of arm E.

The setting mechanism is readily sprung by pressure exerted downwardly upon the inner end of the trigger-stick, in which event the latter will shift endwise in an outward direction to an extent to release the catch, and thereby allow the drop-cover to fall, it being observed that the opening $a$, through which the trigger-stick extends, has its upper wall inclined upwardly and outwardly and that the trigger-stick is normally inclined. When, therefore, a rat or the like crawls over the inner end of the trigger-stick or pulls downwardly thereon, should it be baited, the trigger-stick will by reason of such force exerted upon its inner end be moved endwise in a direction and to an extent to release the catch G. Pressure could be exerted laterally against the inner end of the trigger-stick to an extent to cause its outer end to release the catch; but it is usually and more readily operated as hereinbefore first described. Upon the release of the catch the arm E will swing upwardly and close within the socket-rod I, so as to permit the latter to slide through the guide-bar D, and the drop-cover will thereupon fall and instantly close the box, thereby confining the rat or rats within the latter and preventing their escape. The drop-cover will also descend upon the rat or rats with a degree of force proportional to its weight. The rats or other animals, if not directly killed by the fall of the drop-cover, will suffocate shortly after being caught, and this will be facilitated by baiting the trap with dry oatmeal or the like as a decoy, it being also observed that where a rat has entered the chamber and has not sprung the trap its presence will act as a decoy for others.

Where it is desired to catch rats or other small animals without killing them, a small block or the like can be placed upon the bottom of the box, so as to limit the extent of fall on the part of the drop-cover.

What I claim as my invention is—

An animal-trap comprising a box or casing providing a chamber which is open at the top when the trap is set and which forms a receptacle in which the rats or other animals are decoyed; a sliding drop-cover which is adapted to slide within and both close the chamber and fall upon the rats or other animals therein when the trap is sprung, and which is maintained in an elevated position over the chamber when the trap is set; means for guiding the drop-cover; and a setting device for maintaining the drop-cover in an elevated position and for releasing it when sprung by a rat or other animal within the chamber; said setting device comprising a trigger-rod arranged to extend through an opening in the side of the box, and a catch having a suitable connection with the said drop-cover and adapted to engage in notches respectively in the box and said trigger-rod; the said setting device being normally maintained in a set condition by forcing the said trigger-rod inward and thereby cramping or jamming the same in the opening through which it extends, and the device when thus set being sprung by an endwise and outward shift on the part of the said trigger-rod, substantially as described.

GEORGE E. WEEDEN.

Witnesses:
A. F. DURAND,
MARGARET M. WAGNER.